March 11, 1958 R. C. RIKE 2,826,041
POWER BRAKE BOOSTER
Filed Oct. 18, 1954 3 Sheets-Sheet 1

INVENTOR.
RICHARD C. RIKE
BY
Craig V. Morton
ATTORNEY

INVENTOR.
RICHARD C. RIKE
BY Craig V. Menton
ATTORNEY

March 11, 1958 R. C. RIKE 2,826,041
POWER BRAKE BOOSTER
Filed Oct. 18, 1954 3 Sheets-Sheet 3

INVENTOR.
RICHARD C. RIKE
BY Craig V. Menton
ATTORNEY

United States Patent Office 2,826,041
Patented Mar. 11, 1958

2,826,041

POWER BRAKE BOOSTER

Richard C. Rike, Dayton, Ohio, assignor to General Motors Corporation, Detroit, Mich., a corporation of Delaware Application October 18, 1954, Serial No. 462,648

12 Claims. (Cl. 60—54.6)

This invention relates to a brake booster mechanism to provide for power actuation of the brakes of the motor vehicle.

An object of the invention is to provide a brake booster of simplified construction in which mechanical devices provide for a brake reaction feeling through the brake booster.

Further objects and advantages of the present invention will be apparent from the following description, reference being had to the accompanying drawings wherein a preferred form of the invention is clearly shown.

Figure 1:
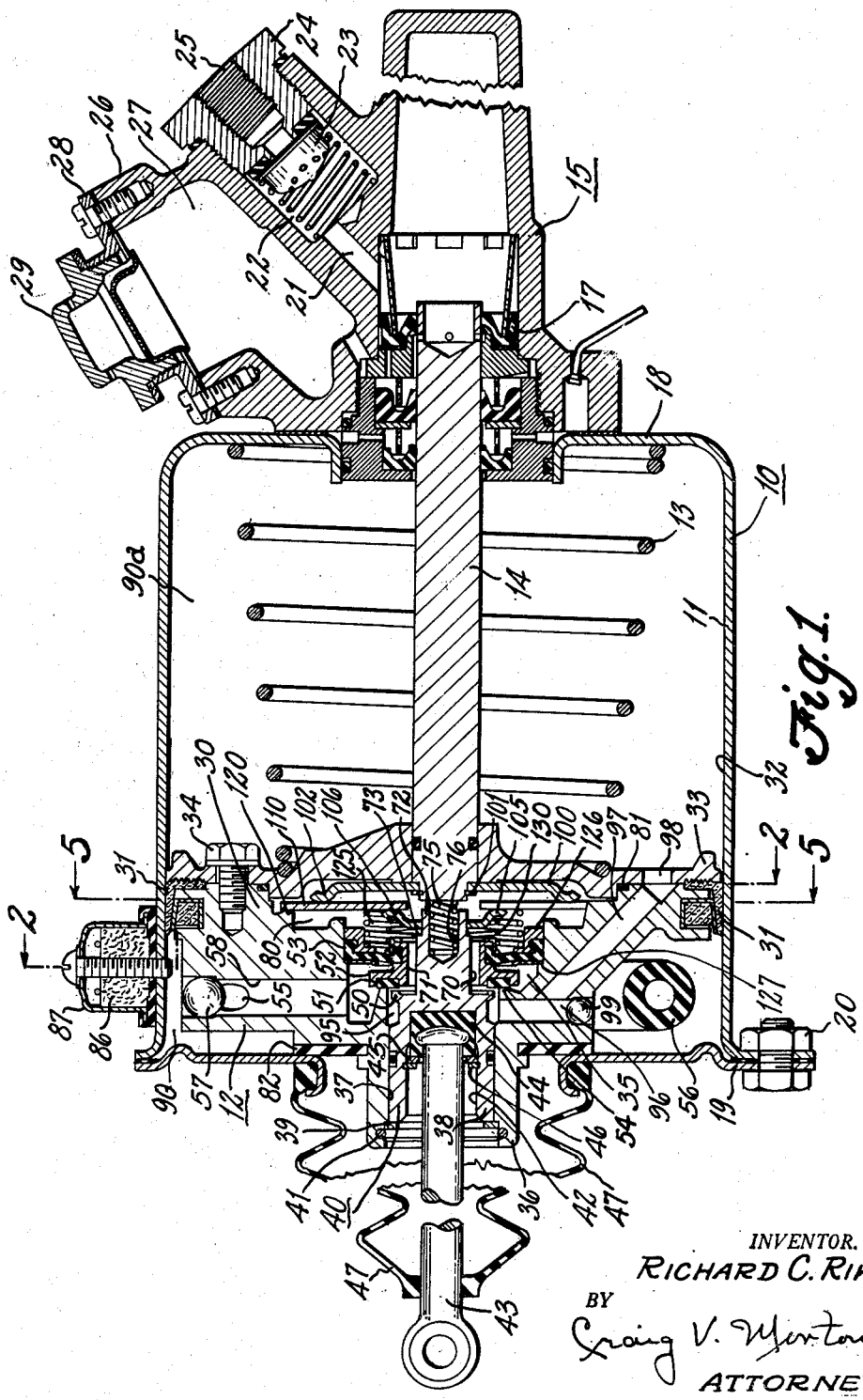
Figure 1 is a longitudinal cross sectional view through a brake booster mechanism incorporating features of this invention.

In this invention the brake booster mechanism comprises a fluid motor 10 that consists of a housing or casing 11 in which a piston unit 12 operates in a reciprocal manner. The fluid motor 10 is adapted to be operated by differential of pressure applied on opposite sides of the piston unit 12, the differential of pressure being obtained by evacuating the housing 11 on one side of the piston unit 12 whereby the piston unit will be caused to move in one direction. A compression spring 13 normally retains the piston unit 12 in the position shown in Figure 1.

The piston unit 12 carries a displacement member or plunger 14 that enters a hydraulic fluid master cylinder 15 through a multiple seal structure 17.

The master cylinder 15 is mounted on the closed end 18 of the housing 11. The opposite end of the housing 11 is closed by means of a cover member 19 secured thereto by the bolts 20.

When the plunger 14 enters the master cylinder 15 to displace hydraulic fluid therefrom, the hydraulic fluid passes through the discharge port 21 into the check valve chamber 22 and thence through the check valve 23 into the fitting 24 having the discharge port 25. The check valve 23 also provides for retaining a predetermined low value hydraulic fluid pressure in the hydraulic lines of the hydraulic brake system in conventional manner, the brake lines of the hydraulic system receiving fluid from the discharge port 25.

The master cylinder 15 is integral with a reservoir 26 that has the reservoir cavity 27 provided with a closure cap 28 that has a removable filler cap 29 provided thereon.

The piston unit 12 comprises a generally annular body 30 that has a resilient seal structure 31 between the body 30 and the inner wall 32 of the housing 11. The seal structure 31 is retained on the body 30 by a wall or cap member 33 held thereon by bolts 34.

The annular body has a recess forming a coaxial annular chamber 35 that receives a valve mechanism 40 to control fluid flow to the right hand side of the piston unit 12, as viewed in Fig. 1. Coaxial with the chamber 35 there is provided a boss 36 that has the coaxial bore 37 that receives a cylindrical valve element 38. The valve element 38 is retained within the bore 37 by means of a washer 39 and a snap ring 41. The cylindrical valve element 38 is provided with an internal bore 42 that receives the end of a manually operable member 43 that is embedded in the rubber-like member 44 within the bore 42. The member 44 is retained in the bore 42 by means of a washer 45 and a snap ring 46. The manually operable member 43 is connected with the brake pedal of a motor vehicle in any conventional manner for longitudinal reciprocal movement of the member 43 upon actuation of the brake pedal. A rubber-like boot 47 extends between the member 43 and the end wall 19 of the casing to prevent entry of dirt through the wall 19.

The cylindrical valve member 38 has a coaxial annular valve face 50 that normally is in spaced relation with a resilient rubber-like valve seat 51 carried in a movable member 52 that is supported in the chamber 35 by means of a flexible diaphragm wall 53.

The valve seat 51 normally engages a valve face 54 that is coaxial with the valve face 50 and spaced radially therefrom, the valve face 54 extending slightly in advance of the valve face 50 when the valve mechanism is in the released position, or off position, as illustrated in Figure 1.

The chamber 35 in the piston unit body 30 is provided with a radial passage 58 that has a side opening 55 connected with a flexible rubber-like tube 56 that extends through the wall 11 of the fluid motor 10 and is adapted to be connected to a source of vacuum power on a motor vehicle with which the device is associated.

The end of the passage 58 is closed by a ball 57 being driven into the end of the opening.

The cylindrical valve element 38 has a reduced diameter portion 70 that extends through the axial bore 71 provided in the member 52, the reduced diameter portion 70 terminating in a further reduced diameter portion 72 that provides a shoulder 73.

A light compression spring 75 is received within an axial bore 76 in the valve member 38 with one end engaging the bottom of the bore 76 and the opposite end engaging the left hand of the displacement member or plunger 14 that extends through the wall or cap member 33 and is journaled therein. The spring 75 maintains the valve element 38 normally in predetermined spaced relationship with the end of the plunger or displacement member 14, shown in Fig. 1.

The body member 30 of the piston unit 12 has a recess therein forming a chamber 80 that is closed by the cap member 33, a seal member 81 being provided between the attached parts. The compression spring 13 normally retains the piston member unit 12 in the position shown in Fig. 1 with the resilient bumper 82 engaging the wall 19 of the motor housing.

Figure 3:
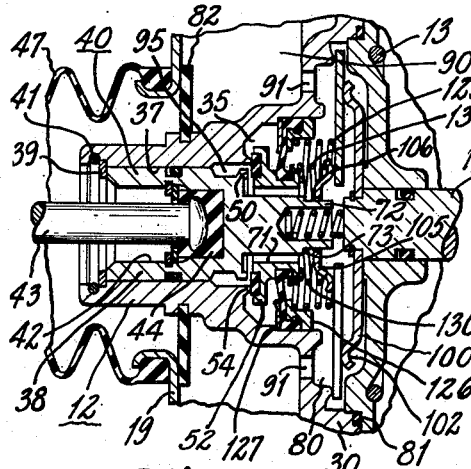
Figure 3 is a longitudinal cross sectional view of a portion of the mechanism taken along line 3—3 of Fig. 2.
Figure 2:
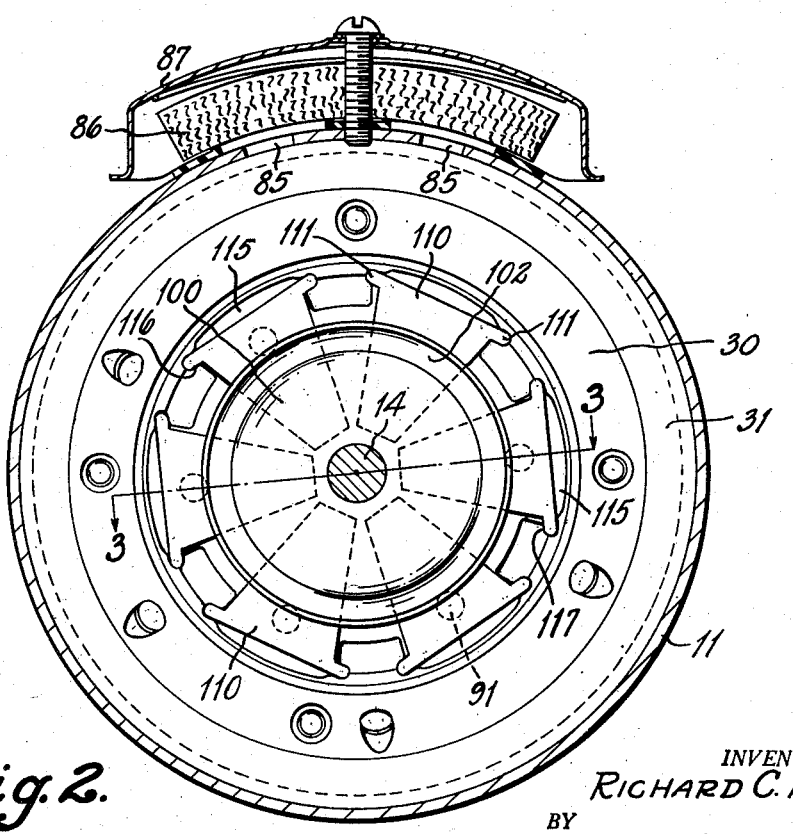
Figure 2 is a transverse cross sectional view taken along line 2—2 of Figure 1.

To provide for admission of atmospheric pressure into the housing 11 to establish pressure differential on opposite sides of the piston unit 12 when the right hand side of the piston unit is connected with a source of vacuum, the housing 11 is provided with openings 85 that are covered with an air filter 86 retained in place by a protective cover 87, as shown in Figure 2. A suitable resilient gasket is provided between the air filter 86 and the housing 11 to prevent air by-passing the filter unit. Atmospheric air enters the chamber 90 on the left hand side of the piston unit 12 and passes through openings 91 provided in the wall of the body member 30, as shown in Fig. 3, that the air can enter the chamber 80. From the chamber 80 the atmospheric air pressure can pass through the bore 71 in the member 52 and between the valve face 50 and the resilient seat 51 into the chamber 95.

The chamber 95 is connected by means of the radial passage 96 and the angular passage 97 in the piston body 30, and through the opening 98 in the cap member 33 with the right hand side of the piston unit 12, shown in Figure 1. The radially outer end of the passage 96 is closed by means of the friction pressed ball 99 therein.

It will therefore be apparent that when the piston unit 12 is in the position shown in Figures 1 and 3 and the valve mechanism is in the position shown, atmospheric pressure is present on both sides of the piston unit 12. This type of brake booster mechanism is commonly known as an air suspended unit.

When using power actuated brake booster mechanism it is necessary that some means be provided to sense the brake action for transmission to the brake pedal and thus be felt by the operator of the vehicle, or else over-braking will occur and there would be no feel of braking effort. It is therefore desirable to have a mechanism incorporated in a brake booster that is actuated by the brake reaction of the hydraulic fluid in the master cylinder to effect a reaction to the brake pedal that gives a feel to the operator of a braking operation, and yet this reaction force must not be so great as to be equivalent to a brake action required by direct pedal action as though no brake booster mechanism were in operation. The purpose of the brake booster is to reduce the pedal effort required in a braking operation, and yet the feel of the braking operation must not be such as to affect a rapid fall of the pedal as though no brake action occurred and the reaction must not be so great as to be equivalent to a straight mechanical action.

It has been common in brake boosters of the prior art to provide a plunger or sleeve either in or around the displacement plunger that operates in the master cylinder so that pressure of the hydraulic fluid in the master cylinder would react on the supplementary sleeve or plunger to effect a brake reaction that would be transmitted through the brake booster to the pedal operated member thereof to obtain a brake feel in the brake pedal.

In this invention there is provided a reaction device that includes a first reaction element or disc 100 that is carried on the end of the displacement member 14 and is positioned in the chamber 80 of the piston unit 12. The reaction element 100 is retained on the displacement member 14 by means of a snap ring 101. The reaction element 100 is preferably in the form of an annular ring and has a raised ring portion 102 near the outer edge periphery to provide a pivot line.

A second reaction element or disc 105 is carried upon the reduced diameter portion 72 of the valve element 38 and is disposed within the chamber 80 of the piston body 30. The reaction element 105 is preferably annular in shape and has an annular raised ring portion 106 that provides an annular pivot line.

A plurality of reaction plates or fingers 110 are placed between the reaction elements 100 and 105, the reaction elements 100 and 105 engaging opposite sides of the reaction plates 110.

Figure 7:
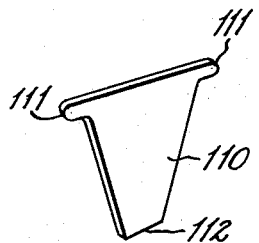
Figure 7 is a perspective elevational view of one of the reaction plates of the reaction mechanism.

Each of the reaction plates 110 is substantially T-shaped, as shown in Figure 7 thereby providing a pair of ears 111 and an end stem portion 112.

Figure 5:
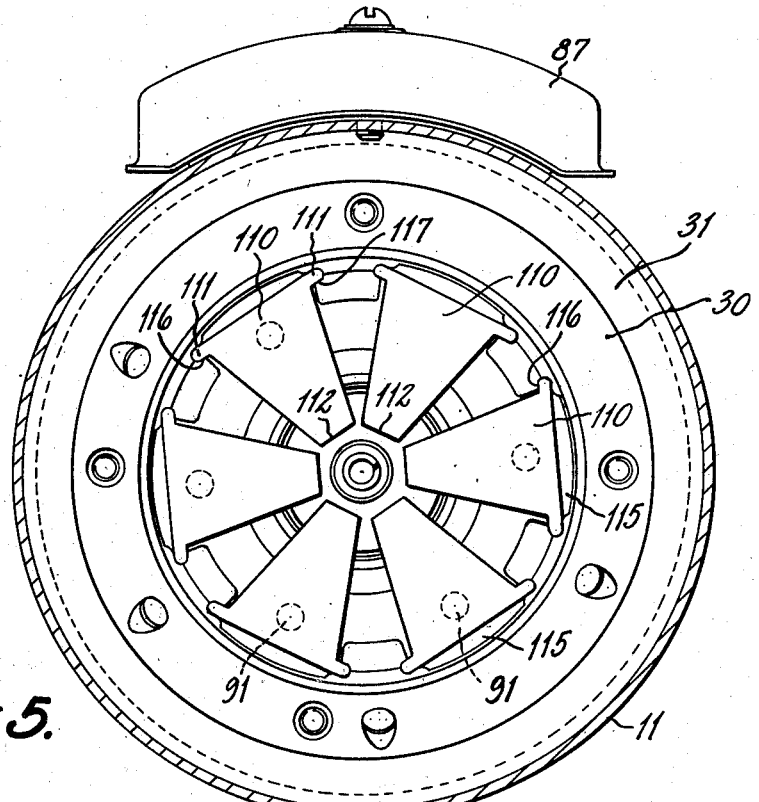
Figure 5 is a transverse cross sectional view taken along line 5—5 of Figure 1.
Figure 6:
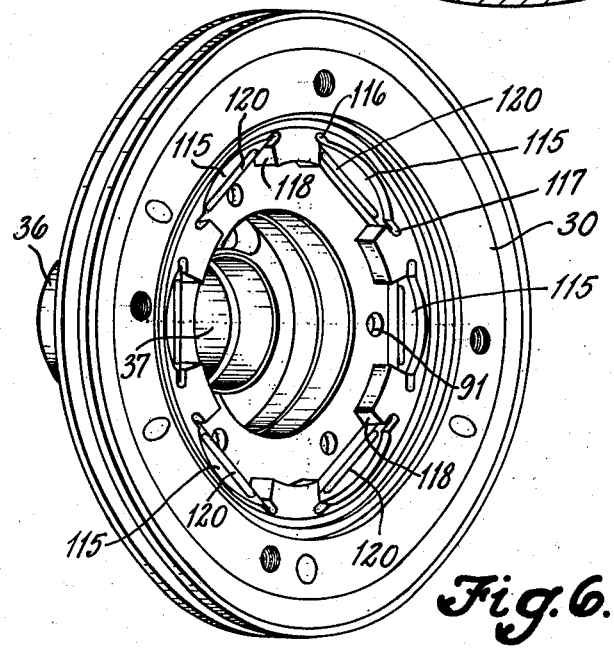
Figure 6 is a perspective elevational view of the piston unit for the device.

The recess 80 on the body 30 of the piston unit 12 has a plurality of individual chambered recesses 115, as shown in the perspective view of Figure 6. Each of these recesses 115 has transversely extending notches 116 and 117 on opposite sides thereof to receive the ears 111 of the reaction plates 110, as shown in Figure 5. The stem portion of the reaction plates 110 extend through the opening 118 of the recess 115. The notches 116 and 117 therefore provide shouldered portions in which the ears 111 of the reaction plates 110 are pivoted. Substantially in line with the notches 116 and 117 there is provided the raised portion 120 on which the head portion of the reaction plates 110 is pivotally engaged.

As shown in Figure 5 the reaction plates 110 are radially disposed relative to the axis of the piston unit 12, and as shown in Figure 1 the reaction plates 110 are disposed substantially in a common plane between the reaction elements 100 and 105 with the reaction elements engaging opposite sides of the reaction plates.

A compression spring 125 is placed between the reaction plates 110 and a retainer 126 that holds the outer periphery of the diaphragm 53 in sealing engagement with the shoulder 127 of the chamber 35. Also, the compression spring 125 engaging the reaction plates 110 urges them to pivot more about the raised portions 120 engaged by the head portion of the reaction plate to hold one face of the reaction plates against the annular pivot ring 102 of the reaction plate 100. A second compression spring 130 is provided between the second reaction element 105 and the inner periphery of the diaphragm support member 53. This spring 130 urges the member 52 in a left hand direction to maintain the resilient seat 51 against the valve face 54 and also urges the reaction element 105 in a right hand direction to maintain the pivot ring 106 of the reaction element 105 in engagement with the inner ends of the reaction element 105 in spaced relationship to the shoulder 73 on the valve element 38. The spring 75 also aids in maintaining the spaced relationship between the reaction element 105 and the shoulder 73 on the valve element 38.

*Operation*

Figure 4:
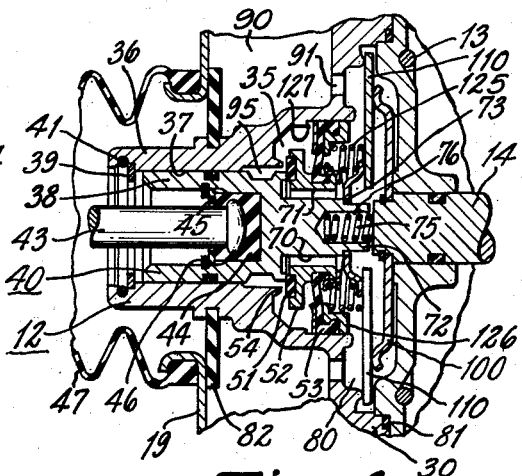
Figure 4 is a longitudinal cross sectional view like that of Fig. 3 but illustrating the valve mechanism in an operating position.

When the brakes are in released condition, the various components of the brake booster assume the positions illustrated in Figures 1 and 3. At this time atmospheric air is present on both sides of the piston unit 12, the air being admitted directly into chamber 90 through the openings 85 from the air filter 86 and to the chamber 90a on the opposite side of the piston through the openings 91, chamber 80, bore 71, valve opening between the valve face 50 and the valve seat 51, chamber 95 and passages 96, 97 and opening 98. When the brake pedal of the vehicle is operated for a braking operation, the manually operable member 43 connected with the brake pedal is moved in a right hand direction as viewed in Figures 1 and 3. The first movement of this member 43 causes the valve face 50 to engage the resilient seat 51 with resultant compression of the light spring 75 thus closing off chamber 95 from the bore 71 and preventing further admission of atmospheric air through the passages 96, 97 and 98 into the chamber 90a of the housing 11. Up to this time no power assistance has been obtained from the booster, nor has any brake application been made because the displacement member 14 has not yet been moved into the master cylinder 15. Merely the light spring 75 has been compressed, this requiring practically no pedal effort to accomplish. Slight further movement of the pedal operated member 43 in a right hand direction will cause the valve seat 51 to be removed from the valve face 54 thereby opening chamber 35 to chamber 95, as shown in Figure 4 whereby the source of vacuum is connected with chamber 95 and through passages 96 and 97 and opening 98 with the chamber 90a of the housing 11 to evacuate chamber 90a. At this time therefore atmospheric air pressure stands in chamber 90 and lesser than atmospheric pressure stands in chamber 90a to obtain a pressure differential on opposite sides of the piston unit 12 to cause the piston unit 12 to move in a right hand direction. Up to this time the only resistance made by the pedal of the vehicle is the light resistance of the spring 75.

When the pressure differential is established on the piston unit 12 and it begins to move in a right hand direction the piston unit will carry the displacement member 14 in a right hand direction through the reaction plates 110 and the reaction element 100. Concurrently, that is when the displacement member 14 moves into the master cylinder 15 as a result of the action of the power actuated piston unit 12, the hydraulic pressure created in the master cylinder 15 will react on the end of the displacement member 14 within the master cylinder 15 urging it in a left hand direction. This brake reaction of the hydraulic pressure fluid will cause the reaction plates 110 to pivot about their pivot ledges 120 and move the reaction element 105 into engagement with the shoulder 73 on the valve member 38 whereby the hydraulic reaction force of the hydraulic fluid in the brake cylinder 15 is transmitted through the displacement member 14 to the piston unit 12 and the valve element 38, and from the valve element 38 to the manually operable member 43 to establish brake feel at the brake pedal of the vehicle.

The only time that the end of the reduced diameter portion 72 of the valve element 38 directly engages the left hand end of the displacement member 14 is when there is a failure of the vacuum source for power actuation of the piston unit. In this manner direct brake action can be obtained through the direct connection from the valve element 38 to the displacement member 14.

The valve mechanism heretofore described is of the follow-up type in that when the brake action is sufficiently strong and the operator tends to stop further movement of the brake pedal, the resilient valve seat 51 will be engaging both valve faces 50 and 54 to hold the plunger 14 in the attained position without any change in pressure conditions on either side of the piston unit 12. The positions of the valve shown in Figure 1 and in Figure 4 provide for either balancing of the atmospheric pressure on both sides of the piston unit 12 or evacuation of chamber 90a of the booster unit to cause advancement of the piston unit 12.

The engagement of the reaction element 100 with the reaction plates 110 is radially outside engagement of the reaction element 105 with the reaction plates 110 with the pivot connection of the reaction plates 110 being radially outside the engagement of the reaction element 100 with the reaction plates 110 whereby the hydraulic reaction forces from the displacement member effected by the hydraulic pressure fluid in the master cylinder 15 are proportioned to the actuating force of the piston unit 12 to obtain a desired percentage of reaction feel to the manually operated member 43. The percentage of reaction forces that are felt through the manually operated member 43 can be changed by changing the pivot connections with the reaction plate 110, that is varying the radial position of the pivot rings 102 and 106 relative to each other.

While the form of embodiment of the invention as herein disclosed constitutes a preferred form, it is to be understood that other froms might be adopted as may come within the scope of the claims which follow.

What is claimed is as follows:

1. A brake booster mechanism comprising, a fluid pressure operated motor including a casing having a pressure differential responsive piston unit operable therein, a master cylinder, a hydraulic fluid displacement member operable in said master cylinder and connected to said piston unit for actuation thereby, a follow-up control valve mechanism carried by said piston unit, and having one position to establish equivalent pressures on opposite sides of said piston unit to inactivate the piston and a second position in which to establish differential pressures on opposite sides of said piston unit to activate the piston, said control valve mechanism including a manually operable member to actuate the valve mechanism, resilient spring means between said manually operable member and said displacement member normally to position said valve mechanism in said one position, a first reaction element on said displacement member, a second reaction element on said manually operable member and movable relative to the same and relative to said first reaction element, stop means on said manually operable member engageable by said second reaction element, spring means resiliently maintaining said second reaction element normally out of engagement with said stop means, and a plurality of fingers between said reaction elements and carried on said piston unit in free suspension with said reaction elements engaging said fingers on opposite sides thereof and radially inwardly of the suspension of said fingers on said piston unit.

2. A brake booster mechanism in accordance with claim 1 in which the said fingers are substantially T-shaped with the head portion thereof providing the support for the fingers and the end of the stem portion engaging the said second reaction element.

3. A brake booster mechanism in accordance with claim 1 in which the first reaction element engages the lever means radially outside engagement of the lever means by said second reaction element and the lever means engages the piston unit radially outside engagement thereof by said first reaction element to proportion the reaction forces transmitted to the valve mechanism to the actuation force of the piston.

4. A brake booster mechanism in accordance with claim 1 in which the first reaction element engages the lever means radially outside engagement of the lever means by said second reaction element and the lever means engages the piston unit radially outside engagement thereof by said first reaction element with the second reaction element and said piston unit engaging said lever means on one side thereof and the first reaction element engaging the lever means on the opposite side to proportion the reaction forces transmitted to the valve mechanism to the actuation force of the piston.

5. A brake booster mechanism in accordance with claim 1 in which the pivotal connection of the lever means with the piston unit is radially outside the engagement of the first reaction element with the lever means and the engagement of the first reaction element with the lever means is radially outside the engagement of the second reaction element with the lever means, said reaction elements engaging the said lever means on opposite sides thereof.

6. A brake booster mechanism comprising, a fluid pressure operated motor including a casing having a pressure differential responsive piston unit operable therein, a master cylinder, a hydraulic fluid displacement member operable in said master cylinder and connected to said piston unit for actuation thereby, a follow-up control valve mechanism carried by said piston unit, and having one position in which to establish equivalent pressures on opposite sides of said piston unit to inactivate the piston and a second position in which to establish differential pressures on opposite sides of said piston unit to activate the piston, said control valve mechanism including a manually operable member to actuate the valve mechanism, a first annular reaction ring on the displacement member, a second annular reaction ring on the manually operable member, and a plurality of flat reaction plates betwen the said reaction rings pivotally supported on the piston unit with the rings disposed on opposite sides of the plates, and engaging the same at radially spaced points whereby the first reaction ring actuates the reaction plates to effect reaction on the second reaction ring to transmit hydraulic reaction forces from the displacement member to the valve mechanism proportioned to the actuating force of the piston unit.

7. A brake booster mechanism in accordance with claim 6 in which the reaction plates are disposed in a common planar arrangement radially disposed about the axis of the piston unit.

8. A brake booster mechanism in accordance with claim 6 in which the reaction plates are disposed in a common planar arrangement radially disposed about the axis of the piston unit with each of the plates being substantially T shaped, said piston unit having paired shoulders thereon engaged by the head portion of the T shaped plates pivotally supporting the respective plates on the piston unit, the end of the stem portion of the said plates engaging the second reaction ring, the first reaction ring being disposed between the engagement of the second reaction ring with the plates and the pivotal mounting of the plates on the piston unit.

9. A brake booster mechanism comprising, a fluid pressure operated motor including a casing having a pressure differential responsive piston unit operable therein, a master cylinder, a hydraulic fluid displacement member operable in said master cylinder and connected to said piston unit for actuation thereby, a follow-up control valve mechanism carried by said piston unit, and having one position in which to establish equivalent pressures on opposite sides of said piston unit to inactivate the piston and a second position in which to establish differential pressures on opposite sides of said piston unit to activate the piston, said control valve mechanism including a manually operable member to actuate the valve mechanism, said piston unit having one face thereof provided with a cover plate cooperating with the piston unit to form an annular cavity coaxial with the axis of the piston unit, a first annular reaction ring on the displacement member in said cavity, a second annular reaction ring on the manually operable member in said cavity, a plurality of reaction plates between the reaction rings and engaged on opposite sides thereby, said plates pivotally engaging the piston unit, whereby to effect transmission of hydraulic reaction forces from the displacement member to said manually operable member.

10. A brake booster mechanism in accordance with claim 9 in which the piston unit has openings therein for passage of fluid from one side of the piston unit into the said cavity, and the said valve means controls flow of fluid from the said cavity to the opposite side of the piston unit.

11. A brake booster mechanism in accordance with claim 9 that includes resilient spring means between said second reaction ring and the valve mechanism to position the said second reaction ring in spaced relationship to stop means on the manually operable member whereby said valve mechanism can be operated by the manually operable member prior to reaction engagement thereof by said second reaction ring.

12. A brake booster mechanism in accordance with claim 9 that includes resilient spring means between said valve mechanism and the displacement member normally to maintain said valve mechanism in predetermined spaced relationship relative to said displacement member, and which also includes resilient spring means between said second reaction ring and said valve mechanism normally to maintain predetermined spaced relationship between said second reaction ring and stop means on said manually operable member whereby to provide for actuation of said valve mechanism relative to said displacement member and said second reaction ring prior to reaction engagement of said second reaction ring with the stop means on the valve mechanism.

References Cited in the file of this patent

UNITED STATES PATENTS

| 1,620,513 | Bragg et al. | Mar. 8, 1927 |
| 2,275,697 | Stelzer | Mar. 10, 1942 |
| 2,457,721 | Price | Dec. 28, 1948 |
| 2,646,665 | Rockwell | July 28, 1953 |